(12) United States Patent
Gecgel et al.

(10) Patent No.: US 12,549,057 B2
(45) Date of Patent: Feb. 10, 2026

(54) SEALING ARRANGEMENT OF A DEVICE FOR DRIVING A COMPRESSOR

(71) Applicant: Hanon Systems, Daejeon (KR)

(72) Inventors: Senol Gecgel, Cologne (DE); David Walisko, Hürth (DE); Thomas Alberternst, Aachen (DE); Bernd Guntermann, Lennestadt (DE)

(73) Assignee: HANON SYSTEMS, Daejeon (KR)

( * ) Notice: Subject to any disclaimer, the term of this patent is extended or adjusted under 35 U.S.C. 154(b) by 250 days.

(21) Appl. No.: 18/487,095

(22) Filed: Oct. 15, 2023

(65) Prior Publication Data
US 2024/0171033 A1 May 23, 2024

(30) Foreign Application Priority Data

Nov. 23, 2022 (DE) .......................... 102022131003.5
Oct. 4, 2023 (DE) .......................... 102023126911.9

(51) Int. Cl.
*H02K 5/10* (2006.01)
*H02K 5/22* (2006.01)
*H02K 11/33* (2016.01)

(52) U.S. Cl.
CPC .............. *H02K 5/10* (2013.01); *H02K 5/225* (2013.01); *H02K 11/33* (2016.01)

(58) Field of Classification Search
CPC ............ H02K 5/10; H02K 5/22; H02K 5/225; H02K 11/30; H02K 11/33
See application file for complete search history.

(56) References Cited

U.S. PATENT DOCUMENTS

| 6,273,754 B1 * | 8/2001 | Bunch ................. H01R 13/405 439/935 |
| 2024/0117801 A1 * | 4/2024 | Yogo ....................... F04B 39/00 |

FOREIGN PATENT DOCUMENTS

| DE | 112015001426 T5 | 12/2016 |
| JP | 2006250145 A * | 9/2006 |

(Continued)

OTHER PUBLICATIONS

Ozaka et al., Machine Translation of JP2006250145, Sep. 2006 (Year: 2006).*

(Continued)

*Primary Examiner* — Eric Johnson
(74) *Attorney, Agent, or Firm* — Shumaker, Loop & Kendrick, LLP; James D. Miller

(57) ABSTRACT

A sealing arrangement for passing electrical connections through a wall of a casing of a device for driving a compressor, formed as an electric motor with a stator and a rotor. The sealing arrangement has a connection arrangement with a holding element and at least one electrically conductive connecting element, which protrudes through a feedthrough hole of the casing from a volume enclosed by the casing. The connection arrangement has a sealing element in each case with a sealing sleeve for a connecting element, which, in an area of the feedthrough hole of the casing and a through hole of the holding element, full-circumferentially enclosing the connecting element, abuts in each case on the connecting element and on the casing and on the holding element in a fluid-tight and electrically insulating manner between the connecting element and the casing, and between the connecting element and the holding element.

28 Claims, 9 Drawing Sheets

(56) References Cited

FOREIGN PATENT DOCUMENTS

| JP | 2012007497 | A | * | 1/2012 | | |
|----|-----------|---|---|--------|---|---|
| JP | 5353834 | B2 | | 11/2013 | | |
| KR | 20180111594 | A | * | 10/2018 | ............ | H01R 13/46 |
| KR | 1020210134807 | A | | 11/2021 | | |

OTHER PUBLICATIONS

Higo et al., Machine Translation of JP2012007497, Jan. 2012 (Year: 2012).*
Hamana et al., Machine Transaltion of KR20180111594, Oct. 2018 (Year: 2018).*

* cited by examiner

SEALING ARRANGEMENT OF A DEVICE FOR DRIVING A COMPRESSOR

CROSS-REFERENCE TO RELATED PATENT APPLICATIONS

This patent application claims the benefit of German Patent Application No. 10 2023 126 911.9 filed on Oct. 4, 2023 and German Patent Application No. 10 2022 131 003.5 filed on Nov. 23, 2023, the entire disclosures of each of which are hereby incorporated herein by reference.

TECHNICAL FIELD

The invention relates to a sealing arrangement for passing electrical connections through a wall of a casing of a device for driving a compressor, in particular an electric motor, for compressing a vaporous fluid, especially a refrigerant. The compressor can be utilized in the refrigerant circuit of an air conditioning system of a motor vehicle.

BACKGROUND ART

Compressors known from the prior art for mobile applications, in particular for air conditioning systems in motor vehicles, for conveying refrigerant through a refrigerant circuit, also referred to as refrigerant compressors, are often formed as piston compressors with variable displacement or as scroll compressors, regardless of the refrigerant. The compressors are driven either by a pulley or electrically.

In the case of hermetic, electrically driven compressors, the electrical energy is to be transmitted through a metal casing from a supply unit outside the casing to an electric motor inside the casing. In addition to the electric motor for driving the respective compression mechanism, the electrically driven compressor in this case has an inverter for driving the electric motor. The inverter serves to convert direct current from a vehicle battery into multi-phase alternating current or three-phase current, which is fed to the electric motor via electrical connections. The electrical connections protruding from the metal casing must be be electrically insulated both from one another and from the casing wall. In addition, the passage of the electrical connections through the casing must be formed so as to be hermetically gas-tight.

Conventional electric motors of the electrically driven compressors can be formed with an annular stator core with coils arranged thereon, and a rotor, with the rotor being arranged inside the stator core. Rotor and stator are aligned on a common axis of symmetry or axis of rotation of the rotor.

The inverter has plug terminals for plug-in connectors formed as pins for establishing electrical connections to terminals of the electric motor, which in turn are electrically connected to connection lines of lead wires of the coils of the stator, also referred to as phase conductors. The terminals of the electric motor are formed in a plug casing, which is arranged, for example, on an end face of the stator aligned in the axial direction of the stator.

During assembly of the compressor, the plug-in connectors formed as pins are each inserted into a connection terminal provided in the plug casing and are each contacted with an end piece connected to a corresponding lead wire, in particular a connection line of the lead wire. In this case, the end piece is electrically and mechanically connected to the connection line of the lead wire in such a way, so as to ensure that there is only a low contact resistance between the plug-in connector of the inverter and the lead wire.

The plug-in connectors protruding from the motor casing and oriented towards the inverter arranged outside the motor casing must be electrically insulated and hermetically sealed in order to ensure that no fluid flowing in the compressor, especially refrigerant and/or oil, escapes into the environment and that no short circuits or damage occur in the inverter, in particular to electrical components arranged on a printed circuit board of the inverter, which can lead to failure of the compressor. In this case, especially the mechanical part of the compressor which is provided with gaseous refrigerant or oil with the electric motor and the compression mechanism driven by the electric motor must be sealed to the inverter as the electrical part of the compressor.

In order to comply with the required insulation resistances of the electrical components and to reliably and completely insulate the current-carrying elements from fluids flowing in the motor casing and any dirt that may be present, glass-to-metal feedthroughs of the plug-in connectors, GTMS for "glass to metal seal" for short, are conventionally used in which the current-carrying elements are sealed to the motor casing by means of metal bead seals or coated metal seals or elastomer seals, in particular with elastic molded parts.

The glass-to-metal feedthroughs known from the prior art have a metal plate, usually made of steel, with through holes in which the current-carrying, pin-shaped plug-in connectors protruding from both sides of the metal plate are arranged, each of which is also made of steel, optionally with a copper core. The open cross-sections between the respective plug-in connector and the metal plate are filled with glass, which mechanically connects the connector to the metal plate and electrically insulates it from the metal plate. The glass provides the hermetic seal between the plug-in connector and the metal plate. The metal plate is usually bolted or welded to the motor casing.

The production of glass-to-metal feedthroughs is very energy-intensive, since the melting temperature of the glass must be reached and must be kept constant for a longer period of time. The reproducibility of the shape of the glass insulation is very time-consuming and expensive.

The plug connectors, which are formed entirely or partially from steel, have poor electrical conductivity. The glass bodies are brittle, so handling must be done with great care. In addition, the quality of the electrical connection is difficult to maintain with such plug-in connectors. The potential for functional integration within the overall device is low. Furthermore, the plug connectors, which are formed entirely from steel, are unsuitable for conducting high electrical currents.

In an electrically driven compressor with a high input voltage of up to 48 V, the ohmic resistance of the plug-in connectors has such an effect due to the higher electrical current with the same or similar electrical power compared to a compressor with an input voltage of 470 V, that the plug-in connectors are heated strongly and greater electrical loss occurs. In order to limit these effects, the diameters of the pin-shaped plug-in connectors must be increased.

The plug-in connector material should have the highest possible electrical conductivity. However, materials with high electrical conductivity are generally unsuitable for being molded directly with glass, and consequently have to be coated or encased with steel before molding. Molding the larger pin-shaped plug-in connectors into the glass-to-metal feedthroughs is therefore very expensive to ensure a good seal between the plug-in connector and the motor casing.

In addition, the plug-in connectors must be contacted by means of expensive and fault-prone contact elements both, on the one hand, with a printed circuit board of the inverter and, on the other, with the electric motor that drives the compressor.

DE 11 2015 001 426 T5 discloses an electrically driven compressor with a compression arrangement, an electric motor for driving the compression arrangement, and an inverter for supplying the electric motor with electricity. The electric motor has a rotor and a stator having an electrically insulating coil bobbin arranged at one end of a stator core, coils arranged on the coil bobbin, and a plug casing with connection terminals for electrically connecting the coils to the inverter. The plug casing is mechanically connected to the stator on the end face of the bobbin. Plug-in connectors are passed through a plate-shaped holding element so as to be hermetically sealed. A hermetic seal is arranged between the holding element and a partition wall of the motor casing facing the inverter.

SUMMARY

The object of the invention is to provide a sealing arrangement for a device for driving an electrically driven compressor of a vaporous fluid, in particular an electric motor, which can be produced in a simple manner and assembled in a time-saving manner. The arrangement should have a smallest possible number of individual components and be structurally simple to implement, also to minimize production cost. In this case, the complexity of the structure of the sealing arrangement and thus of the device should be minimized, while at the same time sealing the hermetic system from the environment and the electrical insulation inside the compressor are optimized. The sealing arrangement should also be formed to conduct high electrical currents and be able to be operated safely with a long service life.

The object is achieved by the subject matter with the features as shown and described herein.

The object is achieved by a sealing arrangement according to the invention for passing electrical connections through a wall of a casing of a device for driving a compressor of a vaporous fluid. The sealing arrangement has a connection arrangement with a holding element and at least one electrically conductive connecting element.

According to the concept of the invention, the at least one connecting element is arranged through a feedthrough hole in the casing, protruding from a volume enclosed by the casing.

The connection arrangement has a sealing element, each with a sealing sleeve for a connecting element. In this case, the sealing sleeve is arranged in an area of the feedthrough hole of the casing and a through hole of the holding element, full-circumferentially enclosing the connecting element, between the connecting element and the casing, and between the connecting element and the holding element in each case fluid-tight as well as electrically insulating on the connecting element as well as on the casing and on the holding element.

The at least one connecting element is advantageously formed as an integral component of the device for driving the compressor. The integral arrangement is understood to mean that the connecting element is firmly connected to other components of the device for driving the compressor, at least during assembly, in particular of the compressor.

The sealing sleeve seals the connecting element to the casing and to the holding element, at least in the radial direction. In addition, any adjacently arranged connecting elements, which are preferably mechanically fixed in the holding element, are electrically insulated both from one another and from the casing and the holding element.

The casing, which is under internal pressure, is sealed to the environment without an additional seal between the holding element and the casing, which reduces the number of components of the sealing arrangement and thus the components of the overall device as well as the costs of production compared to the prior art. The seal arrangement is advantageously a unitary, compact component.

The device for driving the compressor of a vaporous fluid is formed as an electric motor with an immobile stator and a rotor, which extend along a common longitudinal axis. The stator is advantageously positioned in the radial direction on an outside of the rotor, enclosing the rotor. The sealing arrangement according to the invention is formed on a first end face of the stator which is aligned in an axial direction. At this point, the axial direction is to be understood as meaning the direction of the longitudinal axis of the stator, which also corresponds to the longitudinal axis and the axis of rotation of the rotor. An end face aligned in the axial direction is arranged in a plane aligned preferably perpendicular to the longitudinal axis. Each connecting element is advantageously integrated in the stator of the electric motor as a component of the stator, specifically pressed into the stator. In comparison to the prior art, this eliminates the need for contact elements that can be removed on the motor side between the connecting element and the stator, which further reduces the number of components and the complexity of the sealing arrangement and minimizes the production costs. In high-current applications in particular, the removable contacts are technically very demanding and expensive.

According to a first alternative configuration of the invention, at least two connecting elements are provided, so that the sealing element has at least two sealing sleeves. The sealing element with the sealing sleeves is either formed unitarily and in one piece, or the sealing sleeves of the sealing element are formed separately as individual components. Each sealing element is configured as a separate component and separate from the holding element.

In the case of the unitary and one-piece configuration of the sealing element, the otherwise individual sealing sleeves are connected to one another and joined together via crosspieces, for example. If necessary, the sealing element can be easily replaced. When the multi-part sealing element is configured from individual, separate sealing sleeves, said sealing sleeves can be manufactured and assembled separately.

According to a second alternative configuration of the invention, the sealing element is formed unitarily and in one piece with the holding element. In this case, the holding element is overmolded with the sealing element or the sealing element is molded onto the holding element with the corresponding number of sealing sleeves, so that the sealing element and the holding element are formed as an integral component, which further increases the compactness of the sealing arrangement in comparison to the first alternative configuration.

According to a refinement of the invention, each sealing sleeve of the sealing element is formed substantially hollow-cylindrically with partial areas having different diameters, in particular outer diameters and inner diameters, and arranged along a longitudinal axis. In this case, the sealing sleeve of the sealing element preferably has at least three partial areas and a stepped shoulder arranged between two partial areas.

The sealing sleeve of the sealing element is advantageously formed with a first partial area which protrudes from the volume enclosed by the casing, and the holding element. In this case, the first partial area has an outer diameter which is larger than a diameter of the through hole of the holding element, so that the sealing sleeve abuts on a surface of the holding element with an end face of the first partial area aligned in the longitudinal axis, fixing the sealing sleeve.

The sealing sleeve of the sealing element preferably has a second partial area adjoining the first partial area in the direction of the longitudinal axis. The second partial area is arranged within the through hole of the holding element and in the area of a section of the connecting element, in particular a first section of the connecting element, full-circumferentially enclosing the connecting element. In this case, the second partial area of the sealing sleeve has an inner diameter which corresponds to an outer diameter of the section of the connecting element and an outer diameter which corresponds to the diameter of the through hole of the holding element. The first partial area and the second partial area of the sealing sleeve are preferably formed with an identical inner diameter.

The sealing sleeve of the sealing element advantageously has a third partial area adjoining the second partial area in the direction of the longitudinal axis. The third partial area is arranged within the feedthrough hole of the casing and in the area of a section of the connecting element, in particular a second section of the connecting element, full-circumferentially enclosing the connecting element. In this case, the third partial area of the sealing sleeve has an inner diameter which corresponds to an outer diameter of the section of the connecting element, and an outer diameter which corresponds to the diameter of the feedthrough hole of the casing.

Corresponding deviations in the diameters are each formed in such a way as to ensure an clastic deformation of the sealing sleeve for the corresponding sealing.

The third partial area of the sealing sleeve of the sealing element be formed with at least two scaling strips, which have the form of O-rings lined up in a row in the direction of the longitudinal axis and connected to one another.

The stepped shoulder is advantageously formed between the second partial area and the third partial area of the sealing sleeve of the sealing element, connecting the second partial area to the third partial area.

According to a preferred configuration of the invention, the sealing sleeve of the sealing element has a full-circumferentially formed cut in the form of a notch, in particular with a cross-sectionally V-shaped groove, at an end face aligned in the axial direction and pointing into the volume enclosed by the casing.

The sealing sleeve of the sealing element advantageously has at least two sealing lips aligned in the axial direction, which are arranged circumferentially and concentrically to one another on an end face. The sealing lips are separated from one another by the cut and can be formed so as to taper on free end sections pointing in the axial direction. A first sealing surface can be arranged on a lateral surface of an inner, first sealing lip pointing inward in the radial direction, while a second sealing surface can be arranged on a lateral surface of an outer, second sealing lip pointing outward in the radial direction. The first sealing surface of the sealing sleeve can abut on the connecting element and the second sealing surface of the sealing sleeve can abut on the casing in a sealing manner. In addition, the end face of the sealing sleeve can abut on the stator, in particular on a receiving element of the stator, in a sealing manner.

The sealing element is preferably formed from an elastomer, which makes the sealing arrangement, as an electrical feedthrough, insensitive to thermal and pressure-related casing stresses and to vibration stresses.

According to a refinement of the invention, the holding element is formed from a metal. Advantageously, the holding element has the shape of a plate with surfaces arranged opposite one another and, in each case, has a through hole for receiving a connecting element and a sealing sleeve of the sealing element. In this case, the holding element preferably abuts on an outside of the casing and has a formation for enlarging the bearing surface. Each connecting element arranged within a through hole of the holding element preferably protrudes in each case from the surfaces of the holding element.

According to a further advantageous configuration of the invention, each connecting element is formed from a material with high electrical conductivity or low electrical resistance, in particular from copper or aluminum or a corresponding alloy thereof, such as brass or bronze. The use of the material having very good electrical conductivity material allows to minimize electrical losses and the associated heating and to maximize the efficiency and operational reliability of the device. In addition to the electrical conductivity, copper also has a significantly higher thermal conductivity compared to steel, for example, allowing for better cooling of the electrical feedthrough or the connection with the fluid flowing inside the casing. In addition, the material of the connecting element can be freely chosen and does not, as is the case in the production of the glass-to-metal feedthroughs known from the prior art, have to be adapted to thermal requirements.

According to a refinement of the invention, the connecting element is formed as a pin-shaped plug-in connector that is substantially cylindrical, in particular circular-cylindrical, with sections having different outer diameters arranged along a longitudinal axis.

In each case, the connecting element serves to connect electrical terminals arranged inside the casing, in particular a lead wire of a coil of the stator of the electric motor, with electrical terminals arranged outside the casing, in particular of an inverter. In this case, the connecting element can be electrically connected, in particular through via, on one end face to a conductor track formed on the printed circuit board of the inverter.

The connecting element is preferably arranged with a first section being located within the through hole formed in the holding element. In this case, the first section of the connecting element advantageously has an outer diameter which corresponds to a diameter of the through hole minus a gap for receiving the sealing sleeve, specifically the second partial area of the sealing sleeve of the sealing element. The first section of the connecting element is advantageously enclosed at least in areas full-circumferentially by the sealing sleeve, in particular by the second partial area of the sealing sleeve of the sealing element.

The connecting element has in particular a second section which adjoins the first section in the direction of the longitudinal axis and which is formed so as to have a larger outer diameter than the first section, so that a stepped transition is provided between the first section and the second section of the connecting element. In this case, the second section of the connecting element preferably has an outer diameter which substantially corresponds to an inner diameter of the sealing sleeve, in particular of a third partial area of the sealing sleeve of the sealing element. The second section of the connecting element can be full-circumferentially enclosed at least in areas by the sealing sleeve, in particular by the third partial area of the sealing sleeve of the sealing element.

The connecting element is also preferably formed with a third section which adjoins the second section in the direction of the longitudinal axis and has a smaller outer diameter than the second section, so that a stepped transition is provided between the second section and the third sections of the connecting element.

The connecting element can also have a fourth section, which adjoins the third section in the direction of the longitudinal axis and is formed with a smaller outer diameter than the third section, so that a stepped transition is also provided between the third section and the fourth section. The fourth section of the connecting element is preferably enclosed by a lead wire of a coil of a stator of an electric motor, so that the connecting element and the lead wire are in electrical contact with one another.

According to a further preferred configuration of the invention, a receiving element is provided for each connecting element, which receiving element is substantially formed hollow-cylindrically with sections arranged along a longitudinal axis and having different inner diameters. In this case, the receiving element preferably has at least two sections with different inner diameters and a stepped transition between the sections and on the inside.

The receiving element is advantageously arranged with a first section in the area of the second section of the connecting element and with a second section in the area of the third section of the connecting element. The third section and an area of the second section of the connecting element which is arranged adjoining the third section in the axial direction are preferably full-circumferentially enclosed by the receiving element.

The receiving element can be formed with a wall tapering on the free end face pointing in the axial direction towards the sealing sleeve of the sealing element and therefore being wedge-shaped. The tapering wall of the receiving element preferably protrudes into the cut formed in the sealing sleeve of the sealing element. The cross section of the cut of the sealing sleeve and the wall of the receiving element are then formed to correspond to one another.

A further advantage of the invention is that the electric motor has a cover element which is arranged on an end face of the stator which is aligned with the casing with the feedthrough hole. In this case, the receiving element is integrated into the cover element and formed in such a way that a hole for passing the connecting element through the receiving element and the cover element is formed.

The advantageous configuration enables the use of the device for driving a compressor, in particular an electric motor, for compressing a vaporous fluid for a compressor of a refrigerant in a refrigerant circuit of an air conditioning system of a motor vehicle. As an electrical feedthrough, the sealing arrangement is therefore particularly suitable for hermetically sealed high-current air-conditioning compressors for motor vehicles with an on-board voltage of 48 V.

In summary, the sealing arrangement according to the invention or the device for driving a compressor of a vaporous fluid with the sealing arrangement has furthermore a variety of advantages:
- minimum number of components, since separate sealing elements are not required compared to arrangements from the prior art,
- simple and time-saving assembly of components with low complexity, thereby reducing the assembly steps, and minimal production and assembly costs, and
- maximum functional reliability through radial sealing.

DESCRIPTION OF DRAWINGS

Further details, features and advantages of configurations of the invention are apparent from the following description of exemplary embodiments with reference to the associated drawings. In the figures.

DETAILED DESCRIPTION OF EMBODIMENTS

Figure 1:
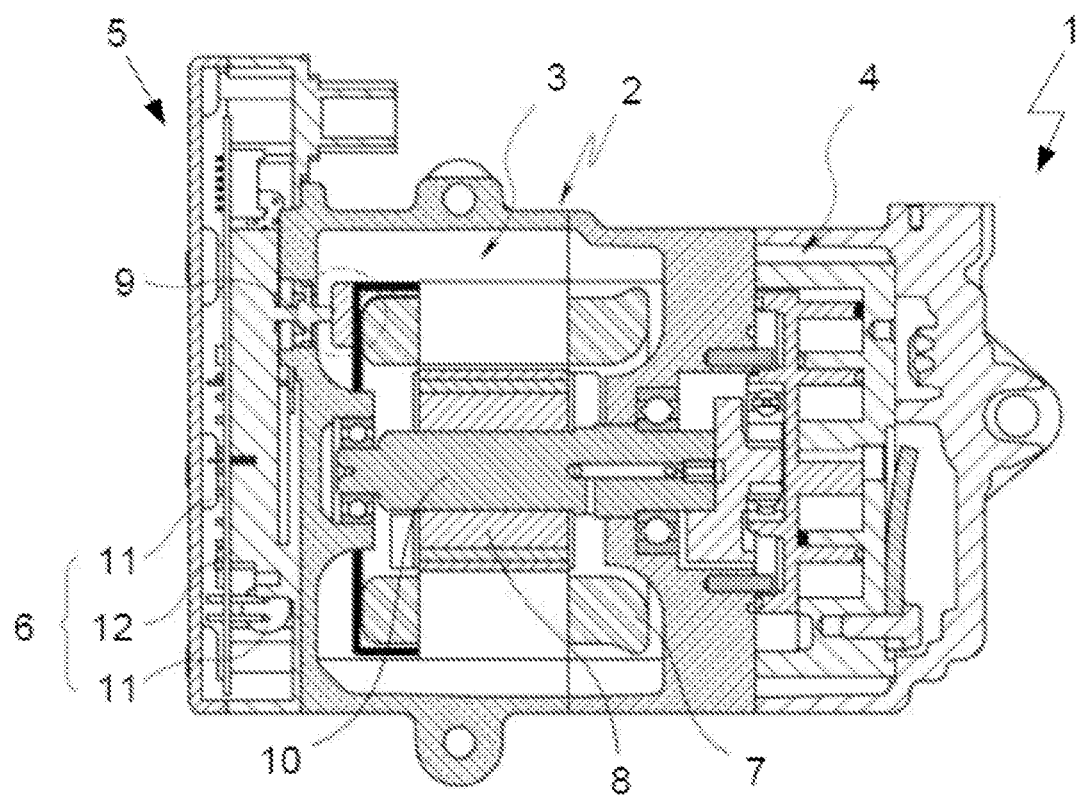
FIG. 1: shows an electrically driven compressor with a device, in particular an electric motor, for driving a compression mechanism and an arrangement of an inverter in a sectional view.

FIG. 1 shows an electrically driven compressor 1 of a vaporous fluid, especially for an air conditioning system of a motor vehicle for conveying refrigerant through a refrigerant circuit, with an electric motor 3 arranged in a casing 2 as a device for driving a compression mechanism 4, and an arrangement of an inverter 5 in a sectional view. The electric motor 3 is supplied with electrical energy via a switching device 6 of the inverter 5.

The electric motor 3 has a stator 7 with a substantially hollow-cylindrically-shaped stator core and coils wound on the stator core, and a rotor 8 arranged inside the stator 7. The rotor 8 is set in rotation when the coils of the stator 7 are supplied with electrical energy via a connection arrangement 9. The connection arrangement 9 is formed on an end face of the stator 7 and has a plurality of electrical terminals.

The rotor 8 is arranged coaxially within the stator 7 and is rotatable about an axis of rotation. A drive shaft 10 may be formed integrally with the rotor 8, or as a separate element.

The electric motor 3 and the compression mechanism 4 formed, for example, as a scroll compressor with a fixed and an orbiting scroll are arranged within a volume enclosed by the casing 2. In this case, the casing 2 is formed from a first casing element for receiving the electric motor 3 and a second casing element for receiving the compression mechanism 4 and preferably formed from a metal, in particular aluminum.

The orbiting scroll of the compression mechanism 4, in which the vaporous fluid, specifically a refrigerant, is compressed, is driven via the drive shaft 10 connected to the rotor 8 of the electric motor 3. According to an embodiment (not shown), the compression mechanism can also be formed with a swash plate, for example.

The switching device 6 for controlling the operation of the electric motor 3 has a printed circuit board 12 formed with various switching elements 11. Different control circuits and components are assembled in an electrically connected manner on the printed circuit board 12 and are supplied with electrical energy from an external power source.

Figure 2A:
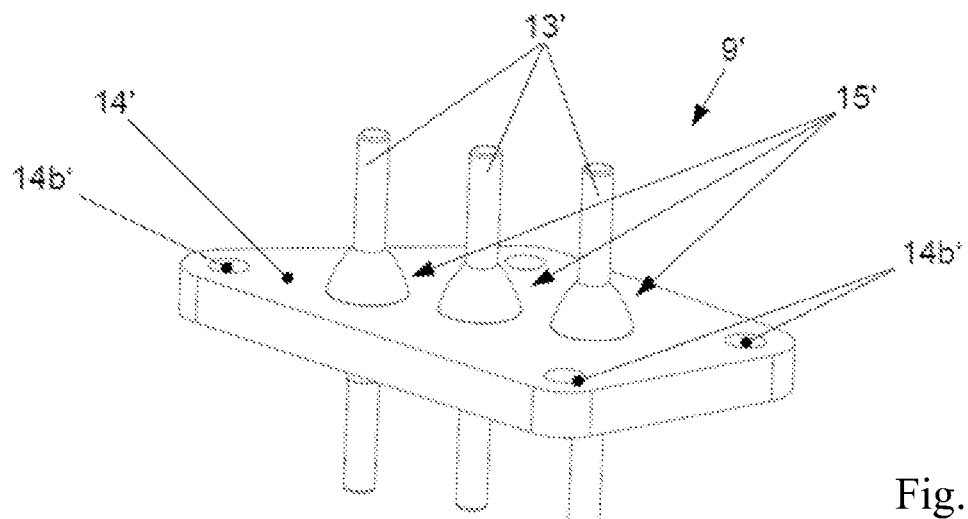
FIG. 2A: shows a connection arrangement of a sealing arrangement for connecting elements with a holding element and molded elements for electrically connection terminals arranged in the plug casing to terminals of the inverter from the prior art in a perspective view.
Figure 2B:
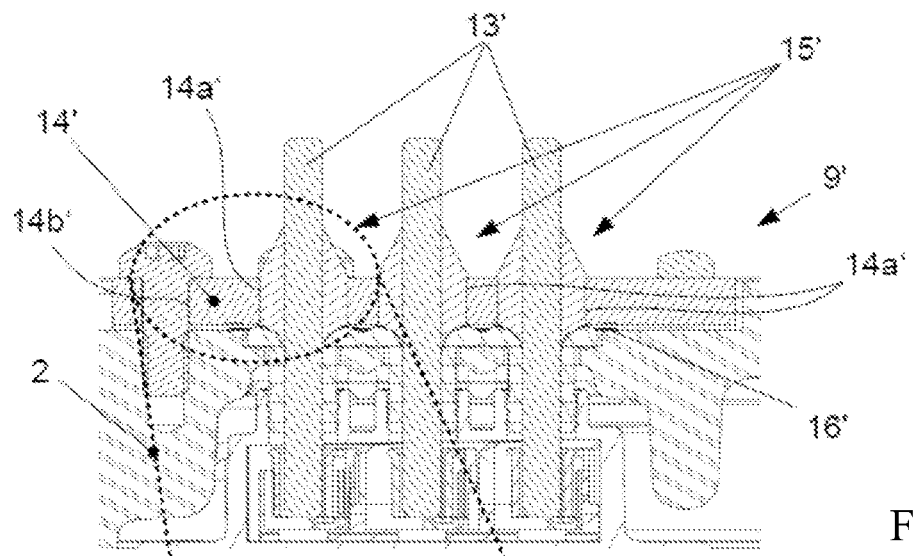
FIG. 2B: shows a detail of a sealing arrangement with the connection arrangement from FIG. 2A with a sealing element from the prior art in a sectional view.

FIG. 2A shows a connection arrangement 9', in particular a glass-to-metal electrical feedthrough, of a sealing arrangement for connecting elements 13' with a holding element 14' and molded elements 15' for electrically connecting terminals arranged in a plug casing (not shown) with terminals of the inverter 5 (not shown) from the prior art in a perspective view. FIG. 2B shows a detail of a sealing arrangement with the connection arrangement 9' from FIG. 2A with a seal 16' for sealing the holding element 14' to the casing 2 from the prior art in a sectional view, while FIG. 2C shows a detailed view, in particular of the seal 16' of FIG. 2B.

The connecting elements 13' are arranged so as to be passed through the plate-shaped holding element 14'. Each connecting element 13' which has the form of a straight pin, also referred to as plug-in connector, is arranged so as to form three different sections, which are aligned along a common axis, in particular a longitudinal axis. In this case a first section and a second section protrude in each case from the opposing surfaces of the plate-shaped holding element 14'. A third section of the connecting element 13' is in each case arranged within the holding element 14'.

The connecting elements 13', which are preferably formed as straight circular cylinders with a diameter that is constant over the length, are each arranged with the third section within a through hole 14a' provided in the holding element 14'. In this case, the inner diameter of the through hole 14a' corresponds to the outer diameter of the connecting element 13' plus a clearance for assembling and fixing the connecting element 13' within the through hole 14a'. The gap formed between the connecting element 13' and the wall of the holding element 14' surrounding the through hole 14a' is filled by the molded element 15', in particular a molded glass element or a glass body. The molded element 15' that fills the gap and is preferably formed from glass serves on the one hand to fix the connecting element 13' within the through hole 14a' and thus to the holding element 14', and on the other hand to insulate the electrically conductive connecting element 13' from the holding element 14'. The molded element 15' protrudes in this case from the plane of the respective surface of the holding element 14' in the direction of the connecting element 13'. The projections of the molded element 15' each substantially have the shape of a cone or a truncated cone.

Figure 2C:
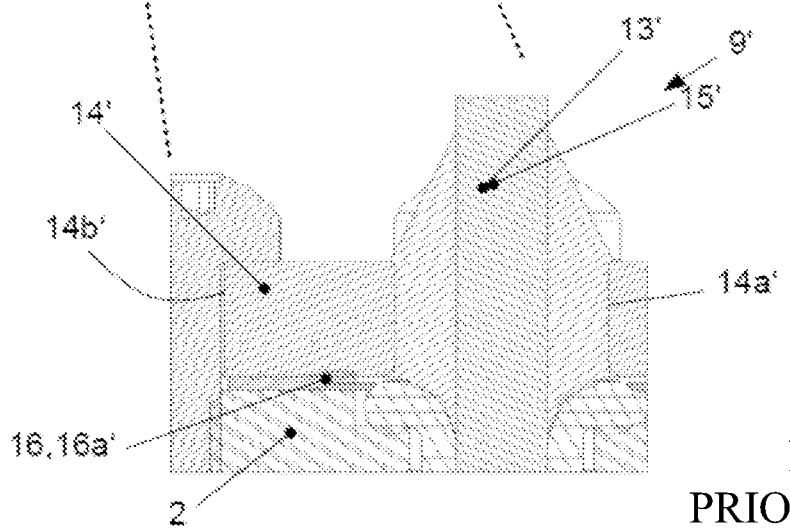
FIG. 2C: a detailed view of the sealing arrangement, in particular the sealing element, from FIG. 2B, FIG. 3A: a stator of the electric motor with a stator core, coils, an insulation and a cover element as well as connecting elements in a perspective view.

As can be seen from FIGS. 2B and 2C, a seal 16' is arranged on the side of the holding element 14' facing the casing 2', which seal 16' seals the holding element 14' with the connecting element 13' and molded element 15' protruding from the holding element 14' against the casing 2. The seal 16', which abuts on the one hand in particular on a sealing seat surface of the casing 2 and on the other hand on the holding element 14', serves to hermetically seal the casing 2 and thus to prevent fluids flowing inside the casing 2, especially refrigerant and/or oil, from escaping into the environment and thus also to the inverter 5 (not shown) and to the electrical components arranged on the printed circuit board 12 of the inverter 5. The holding element 14' is screwed to the casing 2 via fastening screws inserted through fastening holes 14b' formed in the holding element 14'.

The seal 16' can be formed as an elastomer-coated metal seal with a sealing bead 16a'. The sealing bead 16a ' is compressed by tightening fastening screws for connecting the holding element 14' to the casing 2.

Different temperature loads cause expansion and contraction of the seal 16', which cause stress on the entire component arrangement comprising the casing 2, the holding element 14' and the seal 16', and can result in a decrease in the remaining torque of the screw connections or a loosening of the fastening screws and ultimately to a leakage in the area of the holding element 14'.

Figure 3A:
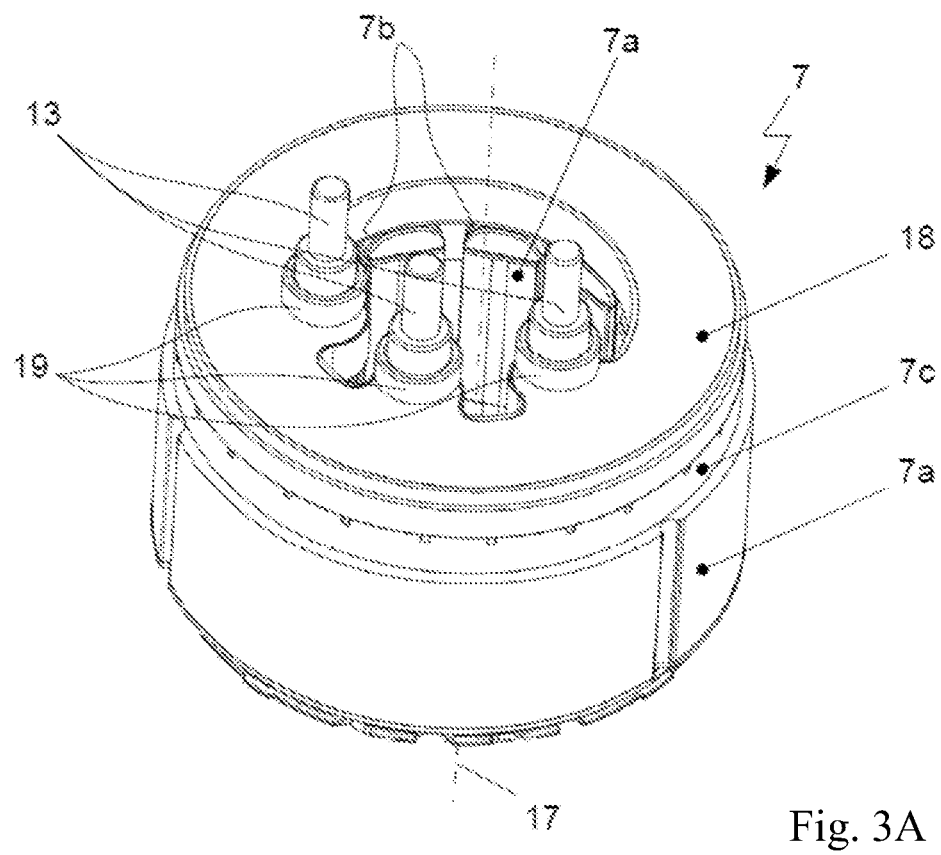
FIG. 3B: the stator of the electric motor from FIG. 3A with the connecting elements contacted with a printed circuit board of the inverter in a perspective view.
FIG. 3C: the stator of the electric motor with the connecting elements from FIG. 3B and a first connection arrangement in a perspective exploded view.
FIG. 3D: a detailed view of the exploded view from FIG. 3C, FIGS. 4A to 4C: the first connection arrangement from FIGS. 3C and 3D with a holding element and a first sealing element in perspective views.

FIG. 3A shows a stator 7 of the electric motor 3 in a perspective view. The stator 7 is formed with a stator core 7a, coils 7b, an insulator 7c, and a cover element 18 and connecting elements 13.

The electric motor 3, for example a three-phase AC motor, has the rotor (not shown) and the stator core 7a arranged in the radial direction on an outside of the rotor and thus around the rotor. The stator core 7a, which is preferably formed as a laminated core, and the insulation 7c, which is formed from an electrically insulating material, each extend along a longitudinal axis 17, which also corresponds to the longitudinal axis of the stator 7 and the axis of rotation of the rotor, from a first end face to a second end face of the stator 7.

The coils 7b are each formed from a wire wound around an area of the stator core 7a that extends inwards in the radial direction, as an electrical conductor, also referred to as a lead wire. The non-wound ends of the lead wires are led out of the respective winding as connection lines.

The stator core 7a, the coils 7b and the insulation 7c form the stator unit of the electric motor 3.

The cover element 18 with receiving elements 19 each having a connecting passage for receiving a connecting element 13 is arranged on a first end face of the stator 7. The in particular electrically conductive, pin-shaped connecting elements 13 are each connected at a first end protruding into the stator 7 with a terminal (not shown), and serve as a component of an electrical connection between the coils 7b of the electric motor 3 and the inverter 5 (not shown). The connecting elements 13 are arranged so as to be passed through the receiving elements 19 which are arranged in the connecting passages of the cover element 18, and inserted in the terminals and protrude in each case with a second end distal to the first end from the stator 7, in particular the cover element 18 or in each case from a receiving element 19. The connecting lines of the lead wires of the coils 7b are electrically conductively connected to the connecting elements 13 via the terminals.

The receiving members 19 arranged inside the connecting passages formed in the cover member 18 serve to insert the connecting members 13 as electrical connectors to the inverter 5 (not shown) when passing through the cover member 18. The connecting passages are aligned in the axial direction with the receiving members 19. The receiving elements 19 are formed from an electrically insulating plastic and hermetically seal the connecting elements 13 to the cover element 18. The cover element 18 serves to seal the electrical terminals of the lead wires of the coils 7b from the fluid flowing in the compressor, specifically refrigerant and/or oil, in order to avoid electrical short circuits which can lead to failure of the compressor.

The connecting elements 13 and the cover element 18 with the receiving elements 19 are preferably formed as an integral part of the stator 7. The cover member 18 serves to establish the integrity of the components. Both the connecting elements 13 and the respective receiving element 19 are connected to the stator 7 via the cover element 18 as a casting, so that the receiving elements 19 are each hermetically sealed to the cover element 18 and the connecting elements 13 are each hermetically sealed to the receiving elements 19. The individual components are glued together via the casting to form a monolith. Alternatively, the coil connectors and the connecting elements 13 can also be formed as a plastic-overmolded component in the form of a plastic-metal assembly. In this case, the receiving elements 19 are each a component of the plastic overmolding.

When the compressor 1 is assembled, the stator 7 is introduced into the casing 2 (not shown) and assembled together with the receiving elements 19 and connecting elements 13 arranged in the cover element 18. The casing 2 has at least one feedthrough hole for receiving the connecting elements 13. The connecting members 13 are centered within the connecting passages of the cover member 18 as a component of the stator 7 by means of the receiving elements 19.

A gap is formed between the connecting elements 13 arranged within the feedthrough hole of the casing 2 and the casing 2, which gap is provided in each case for receiving a sealing element, in particular a radial sealing element.

Figure 3B:
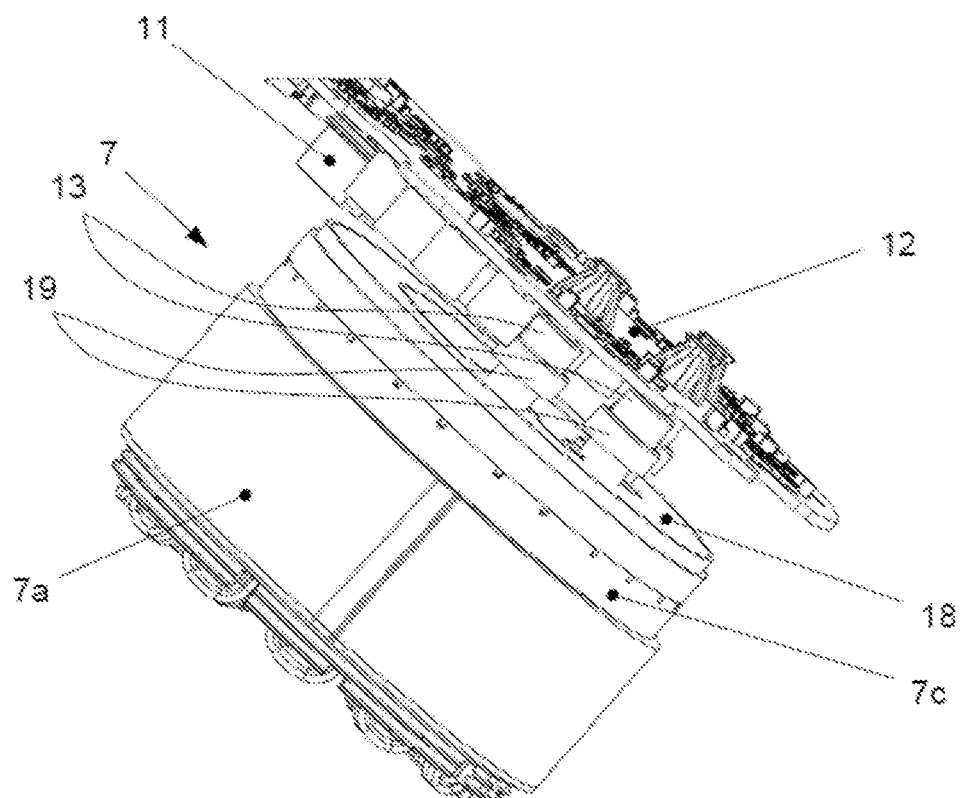
Figure 3C:
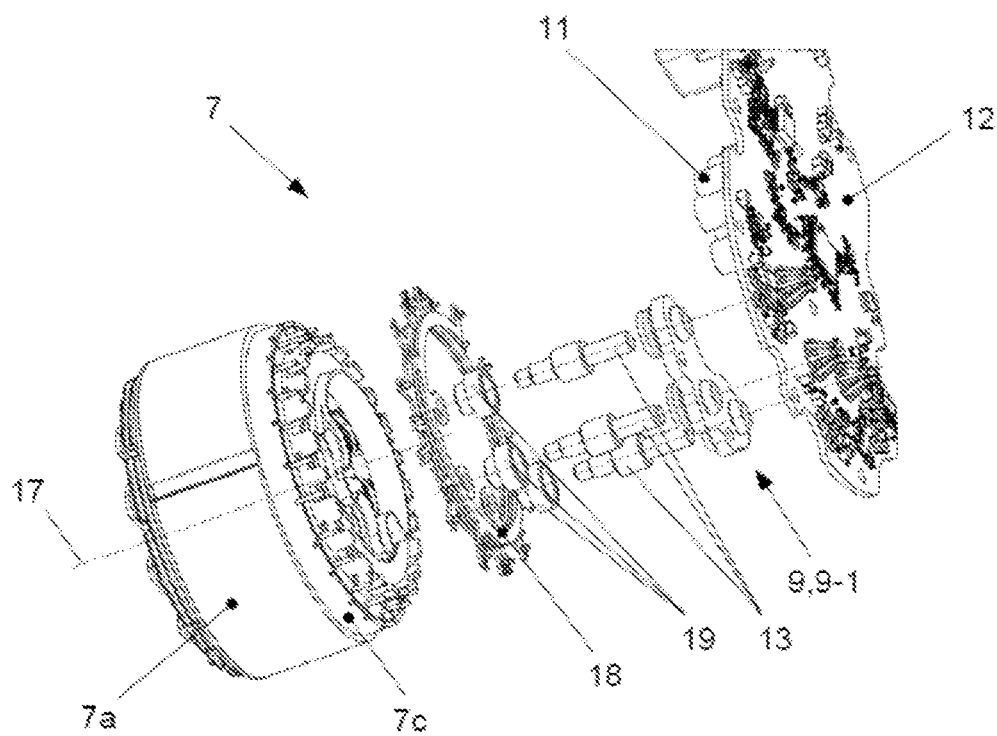
Figure 3D:
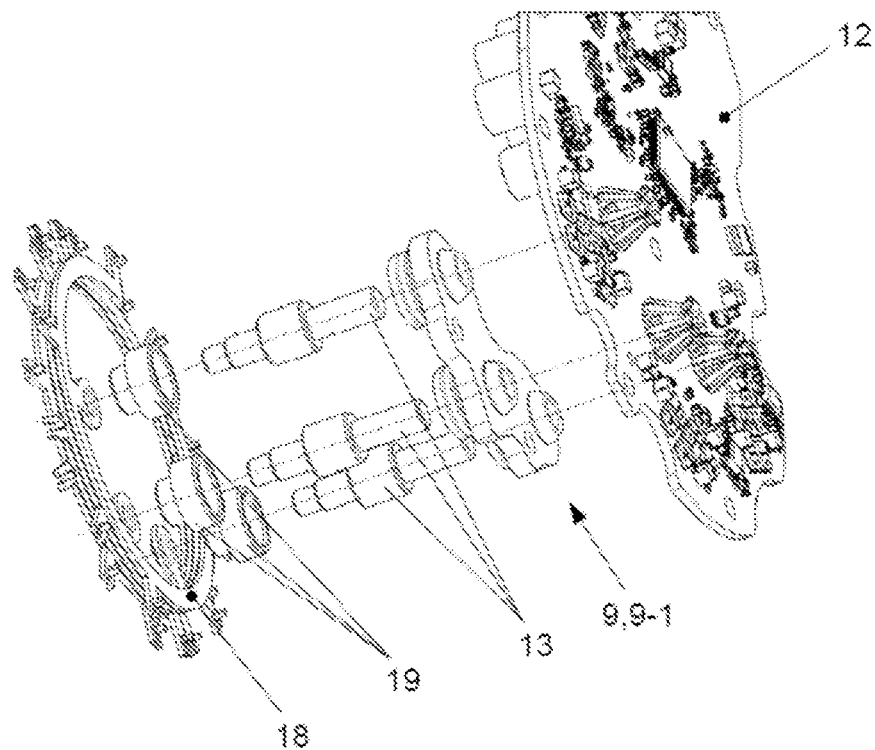

FIG. 3B shows the stator 7 of the electric motor from FIG. 3A with the connecting elements 13 that make contact with the printed circuit board 12 of the inverter 5 in a perspective view. The casing 2 is not shown. FIG. 3C shows the stator 7 of the electric motor with the connecting elements 13 from FIG. 3B and a connection arrangement 9, 9-1 in a perspective exploded view, while FIG. 3D shows a detailed view of the exploded view from FIG. 3C. The casing 2 (not shown) extends in the direction of the longitudinal axis 17 between the cover element 18 and the connection arrangement 9, 9-1.

The connecting elements 13 are contacted with the printed circuit board 12 of the switching device 6 of the inverter 5 with the second ends protruding from the stator 7 and protruding through the casing 2. In this case, the printed circuit board 12 can abut on the casing 2. There is a via between each connecting element 13 and a conductor track of the circuit board 12, establishing an electrically conductive connection between the switching device 6 of the inverter 5, in particular the switching elements 11 arranged on the circuit board 12, to a lead wire of a coil 7b of the stator 7 via the connecting elements 13. Alternatively, the connecting element 13 can be electrically connected to a conductor track formed on the circuit board 12 on the end face facing the printed circuit board 12.

In the area of the casing 2 (not shown), the connecting elements 13 are passed through the connection arrangement 9, 9-1 with their second ends, which hermetically seals the connecting elements 13 to the casing 2 and insulates them electrically.

The holding element 14 is preferably formed as a metal plate, while components of sealing elements provided with the metal plate are each formed from an elastomer.

FIGS. 4A to 4D show a first connection arrangement 9-1 from FIGS. 3C and 3D with the holding element 14 and a first sealing element 20-1 in perspective views and an exploded view.

The holding element 14 has through holes 14a, in particular three through holes 14a, each for receiving a sealing sleeve 21 of the first sealing element 20-1 and a connecting element 13. In the assembled state of the compressor, the connecting elements 13 integrated into the stator 7 of the electric motor 3 according to FIGS. 3B to 3D are each passed through a through hole 14a of the holding element 14 and a sealing sleeve 21 of the sealing element 20-1.

Within each through hole 14a of the holding element 14, a sealing sleeve 21 of the first scaling element 20-1 is arranged next to a connecting element 13 in such a way that a free cross-section between the respective lateral surface of the connecting element 13 and wall of the holding element 14 delimiting the feedthrough hole 14a is closed with a sealing sleeve 21. The sealing sleeves 21 of the first sealing element 20-1 each serve to electrically insulate a connecting element 13 from the holding element 14. In addition, the connecting elements 13 are mechanically supported by the holding element 14 with the sealing sleeves 21 and hermetically sealed to the holding element 14.

Figure 4A:
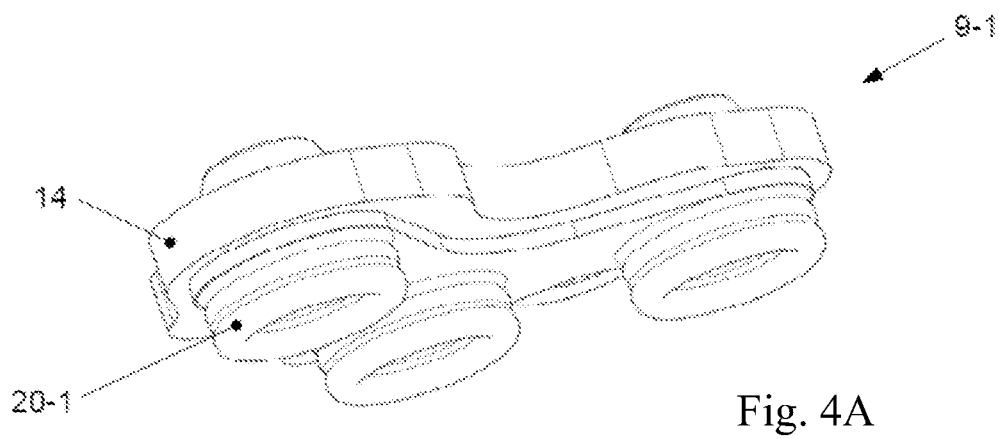
FIG. 4D: the first connection arrangement from FIGS. 4A to 4C in a perspective exploded view.
FIG. 4E: the first sealing element of the first connection arrangement from FIGS. 4A to 4D in a sectional view.
Figure 4B:
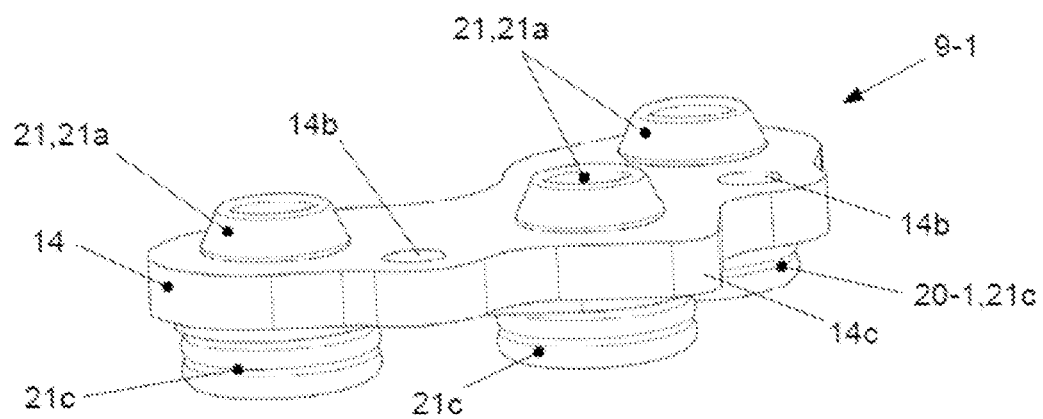
Figure 4C:
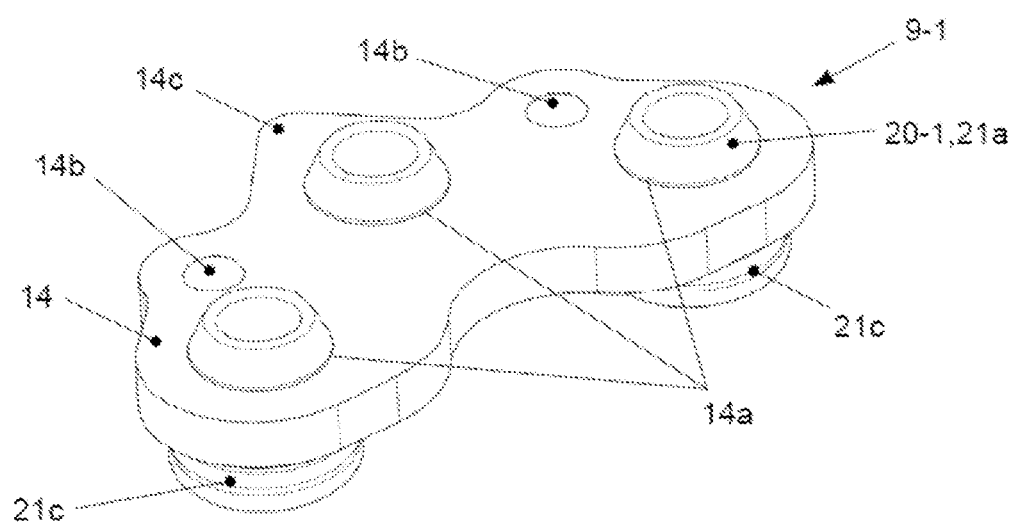
Figure 4D:
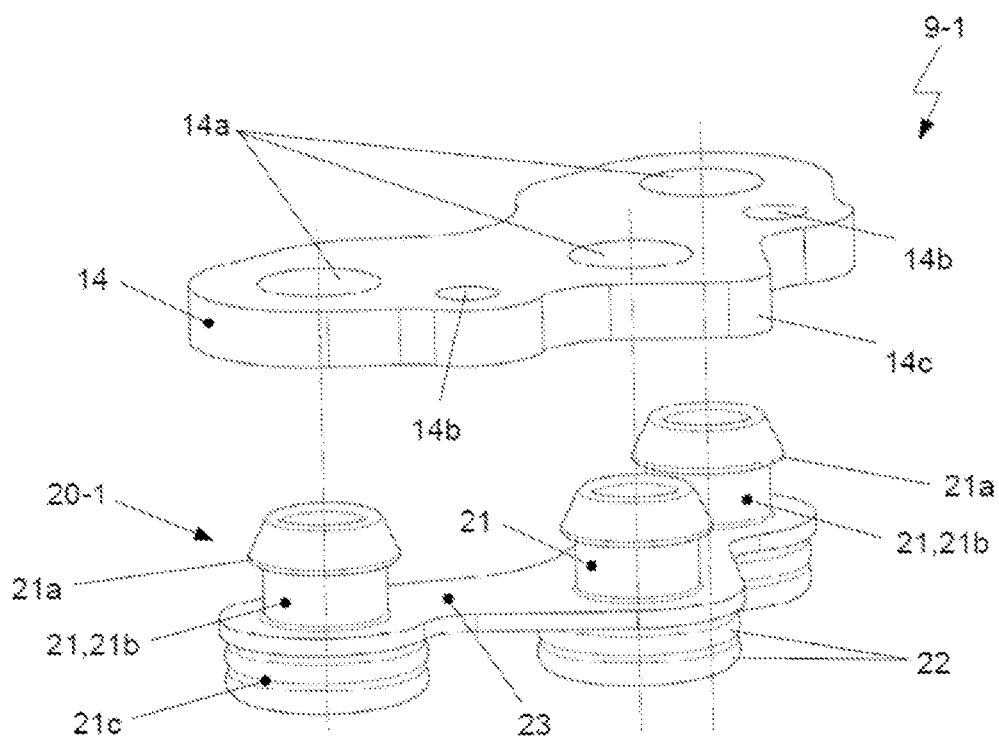
Figure 4E:
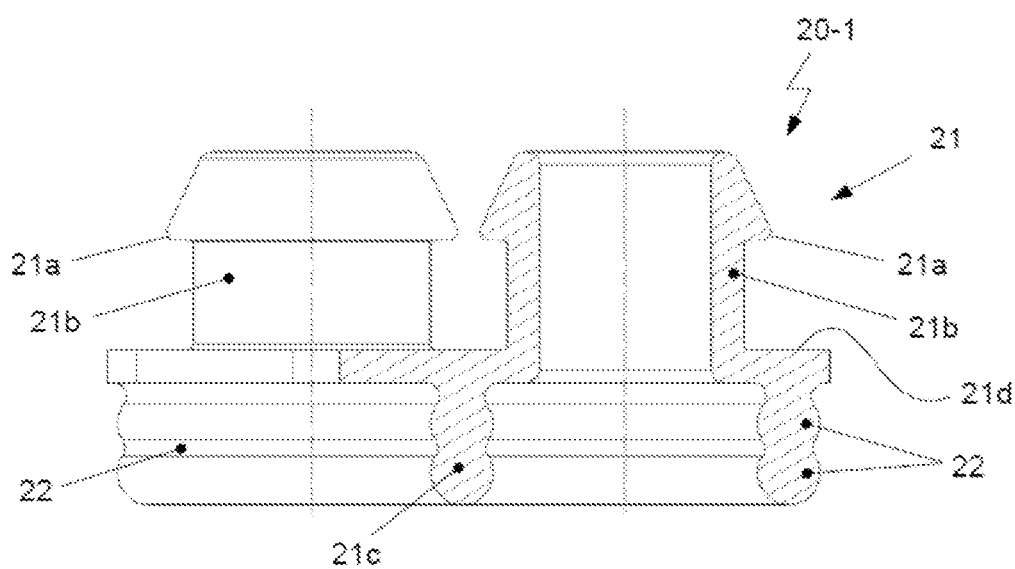

FIG. 4E shows the first sealing element 20-1 of the first connection arrangement 9-1 from FIGS. 4A to 4D in a sectional view.

The sealing sleeve 21 has a first partial area 21a in the form of a bead at a first axial end. The outer diameter of the first partial area 21a tapers towards a free end of the sealing sleeve 21 in order to center the sealing sleeve 21 when it is introduced into the through hole 14a of the holding element 14 and to simplify pushing it through the holding element 14. The outer diameter of the first partial area 21a at the free end of the sealing sleeve 21 is smaller than the diameter of the through hole 14a of the holding element 14.

At the end distal to the tapered end of the first partial area 21a, the first partial area 21a has a full-circumferential edge or projection, which serves as a stop after the sealing sleeve 21 has been passed through the through hole 14a of the holding element 14. In this case, the scaling sleeve 21 abuts on a surface of the holding element 14 with a surface of the first partial area 21a pointing in the axial direction. The outer diameter of the first partial area 21a of the scaling sleeve 21 is larger in this case than the diameter of the through hole 14a of the holding element 14.

A second partial area 21b of the sealing sleeve 21 adjoining the projection of the first partial area 21a in the axial direction has an outer diameter which substantially corresponds to the diameter of the through hole 14a of the holding element 14. In this case, the outer diameter of the second partial area 21b of the sealing sleeve 21 is slightly larger than the diameter of the through hole 14a such that the sealing sleeve 21 abuts hermetically tightly on the holding element 14 in the radial direction and full-circumferentially. On the outside, the length of the second partial area 21b of the sealing sleeve 21 in the axial direction corresponds to the wall thickness of the holding element 14, so that the sealing sleeve 21 abuts on the holding element 14 on the one hand with the edge of the first partial area 21a serving as a stop and, on the other hand, with a third partial area 21c, which adjoins the second partial area 21b in the axial direction, and is fixed to the holding element 14 in this way.

The third partial area 21c of the sealing sleeve 21, which adjoins the second partial area 21b in the axial direction, is arranged so as to protrude into a free cross-section formed between the respective connecting element 13 and the feedthrough hole 2a of the casing 2, in order to electrically insulate the connecting element 13 from the casing 2 and to seal it hermetically. The third partial area 21c has an outer diameter which substantially corresponds to the diameter of the feedthrough hole 2a of the casing 2. In this case, the outer diameter of the third partial area 21c of the sealing sleeve 21 is slightly larger than the diameter of the feedthrough hole 2a of the casing 2 such that the sealing sleeve 21 abuts on the casing 2 in the radial direction and fully circumferentially. In addition, the outer diameter of the third partial area 21c is larger than the outer diameter of the second partial area 21b of the sealing sleeve 21. The second partial area 21b and the third partial area 21c of the sealing sleeve 21 are connected to one another via a shoulder 21d, which also enables sealing the connecting element 13 in the axial direction. The shoulder 21d, also provides support for the connecting element 13 in the axial direction via the sealing element 20-1 against compressive forces acting in the interior of the casing 2. The sealing sleeve 21 abuts with the shoulder 21d on a surface of the holding element 14 and is effective with the stop of the first partial area 21a in fixing the sealing sleeve 21 on the holding element 14.

The third partial area 21c of the sealing sleeve 21 has sealing strips 22 lined up in a row in the axial direction, which have a sealing effect in the radial direction. The sealing strips 22 are formed as a stack of O-rings, in particular two O-rings, which are connected to one another in the axial direction. Here, the inner diameter of the third partial area 21c is also larger than the inner diameter of the second partial area 21b of the sealing sleeve 21. The inner diameters of the first partial area 21a and the second partial area 21b are identical.

The first sealing element 20-1 has, corresponding to the number of through holes 14a formed in the holding element 14, three sealing sleeves 21 which are each arranged in one of the through holes 14a. The sealing sleeves 21 are each connected to one another via a crosspiece 23 formed between two adjacently arranged sealing sleeves 21, so that the first sealing element 20-1 is formed unitarily or in one piece. The one-piece design of the sealing element 20-1 leads to a minimum number of components of the sealing element 20-1.

The holding element 14 with the sealing element 20-1 is attached from the outside of the casing 2 against the casing 2 with the preassembled stator 7 and is connected to the casing 2 for fixing it to the casing 2 by means of screw connections with one or more fastening screws. In this case, the holding element 14 has two fastening holes 14b in order to be connected to the casing 2, in particular screwed.

The positions of the connecting elements 13 are not arranged on a line but on an arc. In order to absorb the pressure-related loads on the sealing sleeves 21 of the sealing element 20-1, the holding element 14 has a formation 14c which protrudes from the outer edge of the holding element 14 and abuts on the casing 2 in a supporting manner.

Figure 5A:
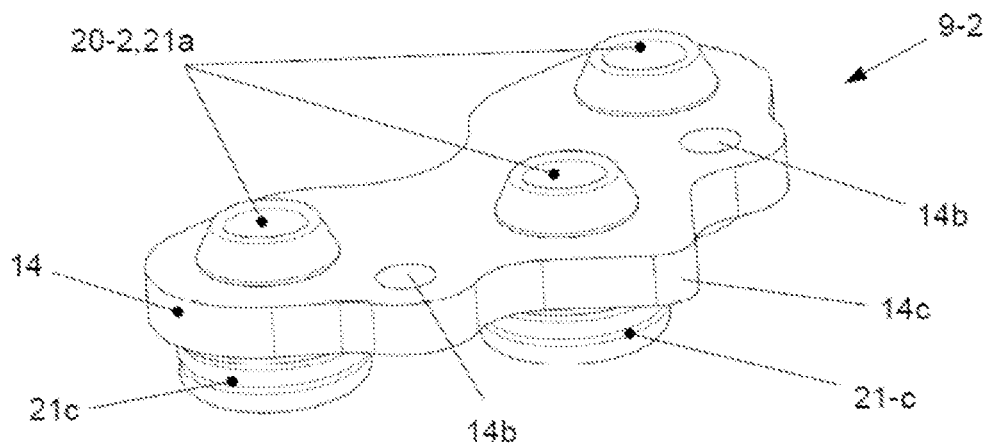
FIGS. 5A and 5B: a second connection arrangement with the holding element and a second sealing element in perspective views.
Figure 5B:
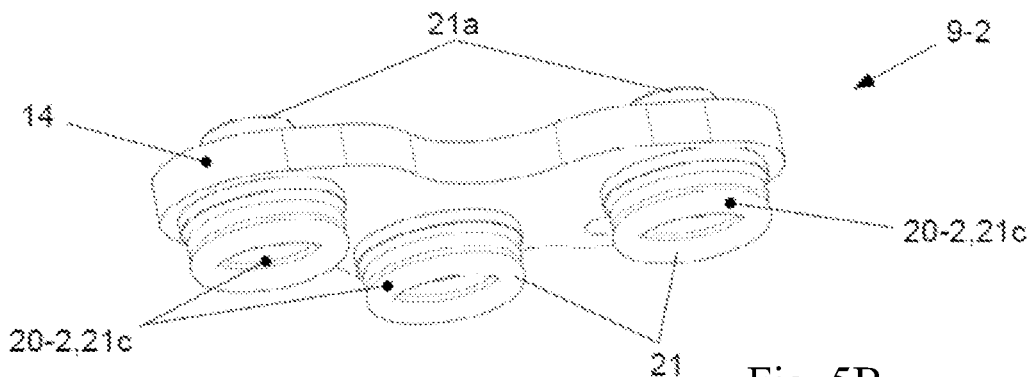
Figure 5C:
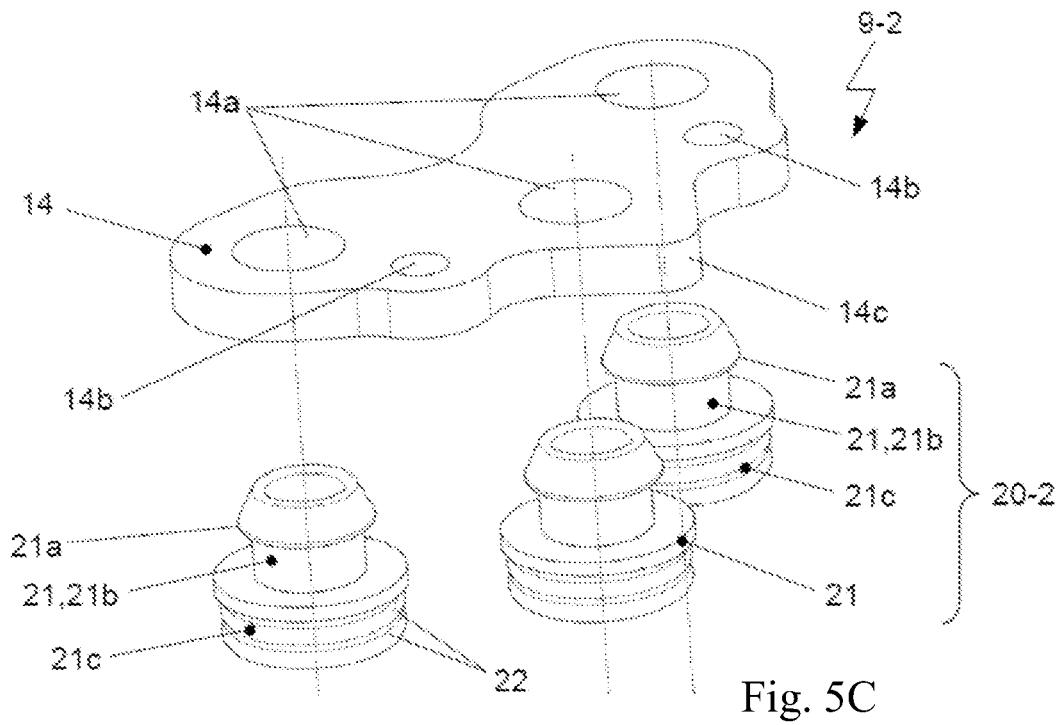
FIG. 5C: the second connection arrangement from FIGS. 5A and 5B in a perspective exploded view.

FIGS. 5A and 5B shows a second connection arrangement 9-2 with the holding element 14 and a second sealing element 20-2 in perspective views, while FIG. 5C shows the second connection arrangement 9-2 from FIGS. 5A and 5B in one perspective exploded view.

In contrast to the first sealing element 20-1 of the first connection arrangement 9-1, the sealing sleeves 21 of the second sealing element 20-2 are formed as separate components that are separate from one another. The sealing sleeves 21 are assembled individually in the holding element 14. Same components of the connection arrangements 9-1, 9-2 are identified by the same reference numerals. Since, in addition to the holding element 14, the sealing sleeves 21 of the connection arrangements 9-1, 9-2 are also the same, reference is made to the explanations for the first connection arrangement 9-1 with a view to FIGS. 4A to 4E for the further design of the second connection arrangement 9-2.

Figure 6A:
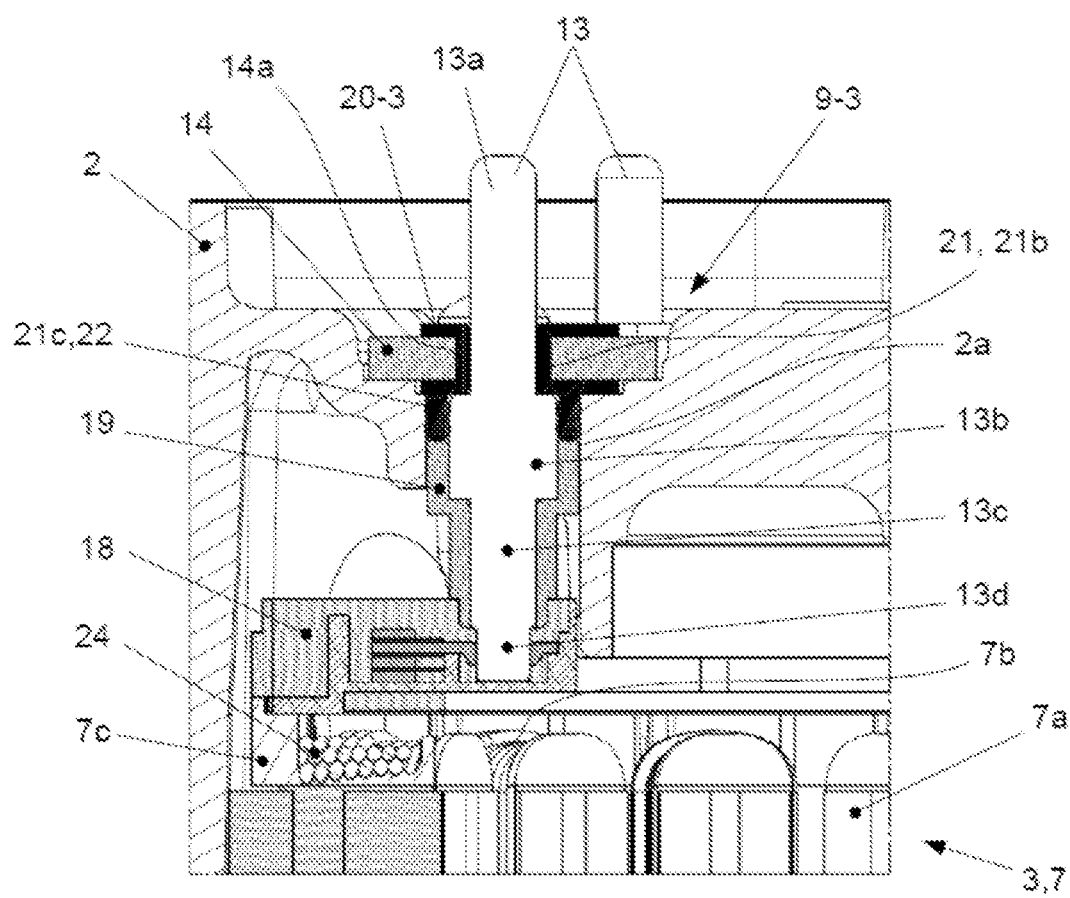
FIG. 6A: a sealing arrangement for passing electrical connections through a casing of the electric motor as a device for driving a compressor with the stator and a third connection arrangement in a sectional view.

According to another alternative embodiment, the third sealing element 20-3 with the sealing sleeves 21 is molded or vulcanized onto the holding element 14, so that a third connection arrangement 9-3 is formed as an integral holding/sealing element. In this case, the method for producing the third connection arrangement 9-3 can enable the use of only one injection point for the third sealing element 20-3 as a soft component. FIG. 6A shows a sectional view of a sealing arrangement for passing electrical connections through a casing 2 of the electric motor 3 as a device for driving a compressor with a stator 7 and a third connection arrangement 9-3.

The stator 7 of the electric motor 3 with the stator core 7a, the coils 7b, the insulation 7c and the cover element 18 is arranged inside the housing 2, which has an end face with a feedthrough hole 2a for the passage of the connecting elements 13.

One end of a lead wire 24 wound around an area of the stator core 7a extending inwards in the radial direction to form a coil 7b is led out of the respective winding and along the cover element 18 as a connecting line to the connecting element 13. The connecting element 13, which serves as a component of the electrical connection between the coil 7b of the electric motor 3 and the printed circuit board 12 of the inverter 5, is passed with a first end through the feedthrough hole 2a formed in the end face of the casing 2 and the receiving element 19 connected to the cover element 18 and arranged so as to be plugged into the cover element 18.

In addition, the connecting element 13 is arranged within the through hole 14a formed in the holding element 14. In this case, the substantially cylindrical connecting element 13 has sections with different outer diameters along the longitudinal axis. A first section 13a is formed with an outer diameter which corresponds to the diameter of the through hole 14a formed in the holding element 14 minus a gap.

A second section 13b adjoining the first section 13a in the axial direction and thus in the direction of the longitudinal axis of the connecting element 13 has a larger outer diameter than the first section 13a, so that a stepped transition is formed between the first section 13a and the second section 13b. In this case, the second section 13b is formed with an outer diameter which corresponds to the diameter of the feedthrough hole 2a formed in the casing 2 minus a gap, and an inner diameter of the sleeve-shaped receiving element 19.

The first section 13a and the second section 13b of the connecting element 13 are full-circumferentially enclosed in areas by the sealing element 20-3. In this case, the sealing sleeve 21 of the sealing element 20-3 with the second portion 21b is arranged within the gap as a free cross section between the holding element 14 and the first section 13a of the connecting element 13, sealing the free cross section in the radial direction. The remaining part of the first section 13a of the connecting element 13 protrudes from the holding element 14 or the sealing element 20-3 and the casing 2 in the direction of the printed circuit board 12 of the inverter 5 (not shown).

In the area of the first section 13a of the connecting element 13, the connecting element 13 is enclosed by the holding element 14 in such a way that the sealing element 20-3, in particular the sealing sleeve 21, abuts sealingly in each case on an outer lateral surface of the first section 13a of the connecting element 13 with an inner lateral, and on an inner surface of the through hole 14a on the holding element 14 with an outer lateral surface.

By means of the shoulder 21d connecting the second partial area 21b and the third partial area 21c of the sealing sleeve 21, the holding element 14 to the casing 2 and the connecting element 13 are each sealed in the axial direction.

In addition, the third section 21c of the sealing element 20-3 is arranged within the gap as a free cross section between the casing 2 and the second section 13b of the connecting element 13, sealing the free cross section in the radial direction. The remaining part of the second section 13b of the connecting element 13 is full-circumferentially enclosed by the receiving element 19.

In the area of the second section 13b of the connecting element 13, the connecting element 13 is enclosed by the casing 2 in such a way that the sealing element 20-3, in particular the sealing sleeve 21, are each abutting sealingly on an outer lateral surface of the second section 13b of the connecting element 13 with an inner lateral surface, and on an inner surface of the feedthrough hole 2a on the casing 2 with an outer lateral surface.

A third section 13c, which in turn adjoins the second section 13b in the direction of the longitudinal axis of the connecting element 13, has a smaller outer diameter than the second section 13b, so that a stepped transition is formed between the second section 13b and the third section 13c.

The third section 13c of the connecting element 13 and the area of the second section 13b of the connecting element 13 adjoining the third section 13c are full-circumferentially enclosed by the substantially hollow-cylindrical receiving element 19. The third section 13c of the connecting element 13 is formed with an outer diameter which corresponds to the inside diameter of the receiving element 19. Consequently, the receiving element 19 is also formed with different, in particular two, sections with at least different inner diameters and thus with a stepped transition on the inside. In the assembled state of the sealing arrangement, a first section of the receiving element 19 is arranged in the area of the second section 13b of the connecting element 13, while a second section of the receiving element 19 is arranged in the area of the third section 13c of the connecting element 13.

A fourth section 13d, which in turn adjoins the third section 13c in the direction of the longitudinal axis of the connecting element 13, has a smaller outer diameter than the third section 13c, so that a stepped transition is formed between the third section 13c and the fourth section 13d of the connecting element 13. The fourth section 13d of the connecting element 13 is full-circumferentially enclosed by the lead wire 24 of the coil 7b of the stator 7. In this case, the lead wire 24 full-circumferentially abuts on the lateral surface of the fourth section 13d of the connecting element 13 and can also abut on the end face of the stepped transition formed between the third section 13c and the fourth section 13d. This ensures electrical contacting between the lead wire 24 and the connecting element 13.

The sealing element 20-3 is thus arranged in each case with the sealing sleeve 21 on the one hand between the holding element 14 and the casing 2, and on the other hand between the connecting element 13 and the holding element 14 on the one hand and the connecting element 13 and the casing 2 on the other hand. The sealing element 20-3 is formed in each case in such a way, on the one hand, to hermetically seal the holding element 14 to the casing 2 and, on the other hand, to electrically insulate and hermetically seal the connecting element 13 both to the holding element 14 and to the casing 2. A radial seal is created in each case between the connecting element 13 and the holding element 14, and between the connecting element 13 and the casing 2. Between the holding element 14 and the casing 2, the sealing element 20-3 seals in the axial direction.

In contrast to the first sealing element 20-1 and the second sealing element 20-2, the first axial end of the sealing sleeve 21 of the third sealing element 20-3 is not in the form of a bead, but has a first partial area 21a abutting flat on the holding element 14. The first partial area 21a is formed with a constant thickness in the axial direction and also serves to fix the sealing element 20-3 to the holding element 14.

Figure 6B:
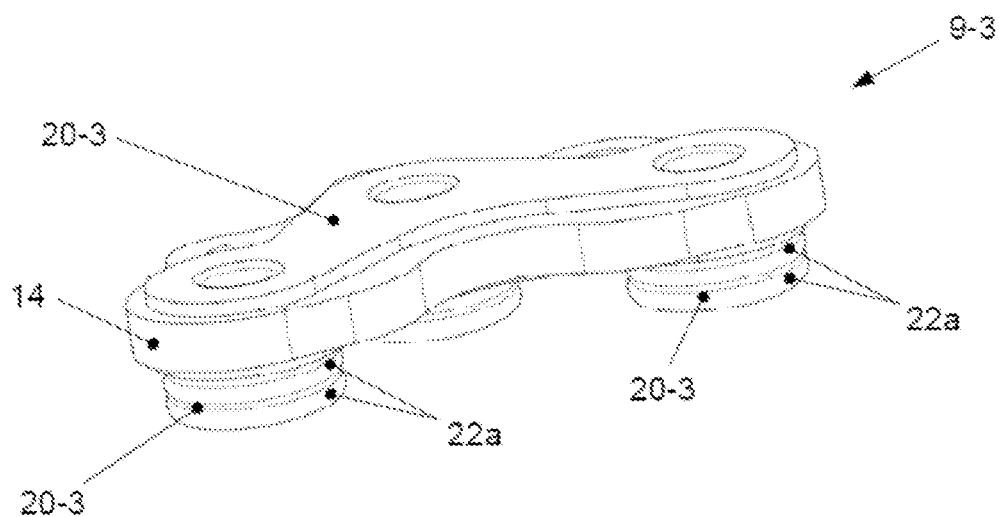
FIG. 6B: the third connection arrangement with the holding element and a third sealing element in a perspective view.

When producing the third connection arrangement 9-3, which is shown in a perspective view in FIG. 6B with the holding element 14 and the third sealing element 20-3, the holding element 14 is inserted in an overmolding tool as a fixed component, in particular as a metal plate, especially as a steel plate. The material of the sealing element 20-3 is then injected as a soft component in order to fill the volume of the soft component that is kept free for the sealing element 20-3 in the casting mold. The third sealing element 20-3 is consequently an integral two-component element. As a soft component, the sealing element 20-3 cannot be separated from the holding element 14 as a fixed component without being destroyed.

The entire connection arrangement 9-3 can be removed for replacement in a single disassembly step and replaced in a single assembly step. Since the connecting element 13 of the connection arrangement 9-3 does not have a fixed end stop in the axial direction, but abuts on the elastic sealing element 20-3 in the axial direction, and the axial alignment of the connecting element 13 is subject to tolerances and depends, in particular, on the axial installation position of the stator 7 in the casing 2, which is subject to tolerances, an electrical connection to the printed circuit board 12 is necessary, which can compensate for an axial offset, according to FIG. 3B.

The sealing sleeve 21 of the sealing element 20-3 also seals with a free end face of the third partial area 21c to the receiving element 19 in the axial direction. The free end face of the third partial area 21c of the sealing sleeve 21 abuts on the end face of the receiving element 19 pointing towards the sealing element 20-3.

Figure 6C:
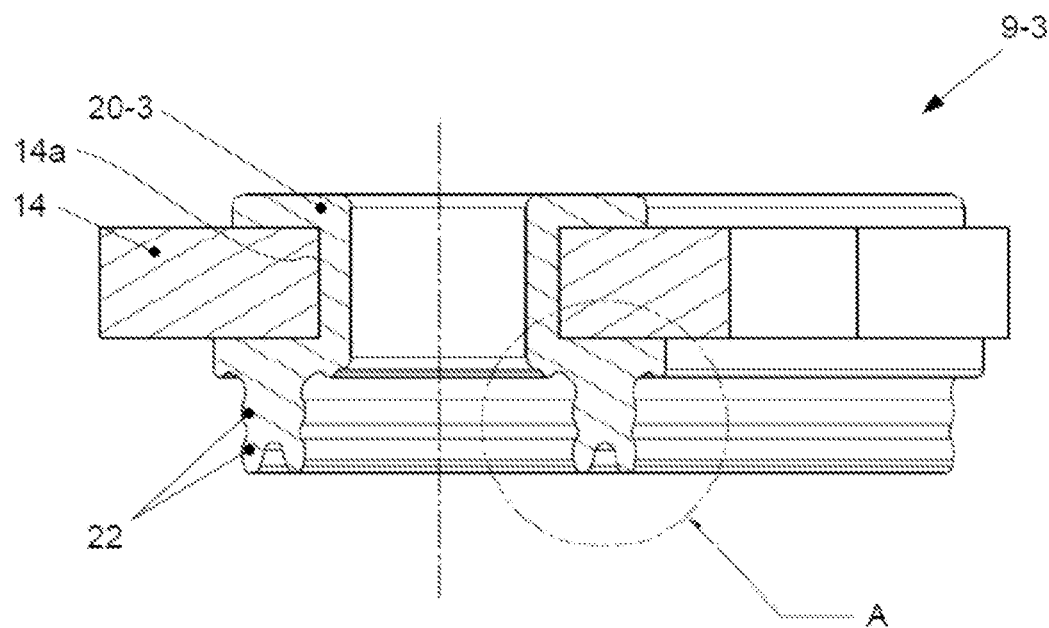
FIGS. 6C and 6D: the third sealing element of the third connection arrangement from FIGS. 6A and 6B in connection with the holding element, each in a sectional view and a detailed view of an area of a sealing sleeve of the sealing element.
Figure 6D:
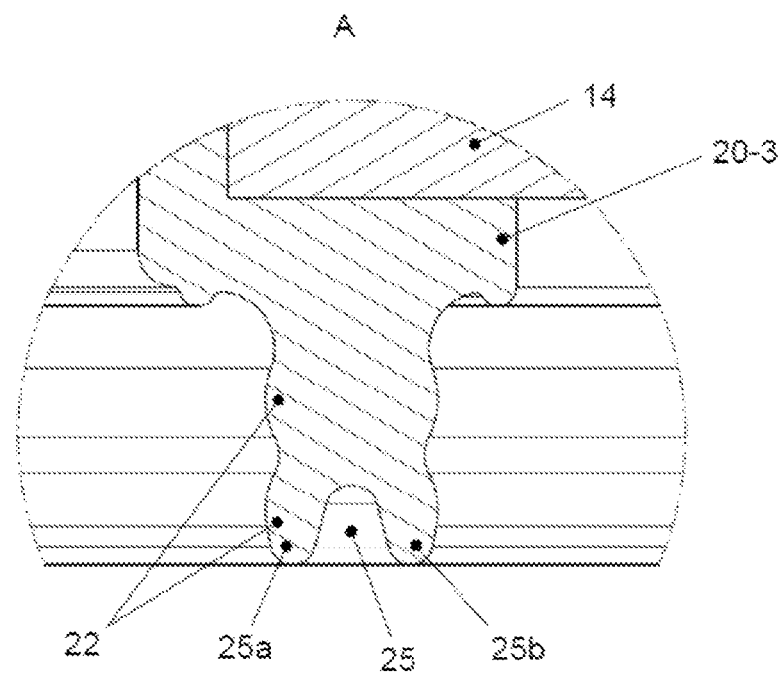

FIGS. 6C and 6D show the third sealing element 20-3 of the third connection arrangement 9-3 from FIGS. 6A and 6B in connection with the holding element 14 in a sectional view and in a detailed view of an area of the sealing sleeve 21. In this case, the free end face of the third partial area 21c of the sealing sleeve 21 pointing towards the receiving element 19 is formed with an alternative cross-sectional geometry to the flat surface with a cut 25 in order to use the effect of the internal pressure within the volume enclosed by the casing 2.

The annular sealing sleeve 21 that seals in the radial direction has the full-circumferential cut 25 in the form of a notch or a groove with a V-shaped cross section on the end face aligned in the axial direction toward the receiving element 19, so that the sealing sleeve 21 is formed with two sealing lips 25a, 25b. The sealing lips 25a, 25b arranged circumferentially around the annular sealing sleeve 21 on the end face are separated from one another in the area of the end face by the cut 25 and are shaped to taper towards the free end sections.

A first sealing surface pointing in the radial direction is formed on the inner lateral surface of the inner, first sealing lip 25b, while a second sealing surface pointing in the radial direction is formed on the outer lateral surface of the outer, second sealing lip 25b of the annular sealing sleeve 21. In this case, the sealing sleeve 21 abuts with the first sealing surface on the connecting element 13 and with the second sealing surface on the inner surface of the feedthrough hole 2a of the casing 2 in each case in a sealing manner.

As a counterpart to the sealing sleeve 21, the receiving element 19 can have a tapering and therefore wedge-shaped wall on the free end face pointing in the axial direction towards the sealing sleeve 21. With the tapered wall, the receiving element 19 can be arranged so as to protrude into the cut 25 provided in the sealing sleeve 21. The cross section of the cut 25 of the sealing sleeve 21 and the tapering wall of the receiving element 19 are formed to correspond to one another in such a way that, as the receiving element 19, which is formed from a hard plastic, such as a thermoplastic or a thermoset, advances into the cut 25 in the axial direction, the sealing lips 25a, 25b of the sealing sleeve 21 are pushed apart in the radial direction and are therefore pressed against the casing 2 on the one hand and against the connecting element 13 on the other. At the same time, the sealing sleeve 21 is pressed against the holding element 14 so that a counter-pressure acting on the sealing sleeve 21 is generated.

As a reaction to the compressive forces, the sealing sleeve 21 is pushed radially outwards and inwards in order to build up radial pressure and thus to press the sealing sleeve 21 with the sealing surfaces against the casing 2 and the connecting element 13 so as to ensure the radial seal.

As a result of the rigid arrangement of the stator 7 with the cover element 18 and the receiving elements 19 within the casing 2 and the movement of the holding element 14 in the axial direction during fixing to the casing 2, for example by means of screw connections, the sealing element 20-3 arranged on the holding element 14 with the sealing sleeves 21 is moved in the axial direction and pushed against the receiving elements 19, so that the sealing effect between the casing 2 and the connecting element 13 is enhanced.

LIST OF REFERENCE NUMERALS 1 compressor
2 casing
2a feedthrough hole of casing 2
3 electric motor
4 compression mechanism
5 inverter
6 switching device
7 stator
7a stator core
7b coil
7c insulation
8 rotor
9, 9-1, 9-2, 9-3, 9' connection arrangement
10 drive shaft
11 switching element
12 printed circuit board
13, 13' connecting element
13a first section of connecting element 13
13b second section of connecting element 13
13c third section of connecting element 13
13d fourth section of connecting element 13
14, 14' holding element
14a, 14a' through hole of holding element 14, 14'
14b, 14b' fastening hole of holding element 14, 14'
14c formation
15' molded element
16' seal
16a' sealing bead
17 longitudinal axis
18 cover element
19 receiving element
20-1, 20-2, 20-3 sealing element
21 sealing sleeve
21a first partial area of the sealing sleeve 21
21b second partial area of the sealing sleeve 21
21c third partial area of the sealing sleeve 21
21d shoulder of the sealing sleeve 21
22 sealing strip
23 crosspiece
24 lead wire
25 cut of sealing element 20-3
25a, 25b sealing lip

What is claimed is:

1. A sealing arrangement for passing electrical connections through a wall of a casing of a device for driving a compressor comprising:
 a connection arrangement with a holding element; and
 at least one electrically conductive connecting element, wherein the device for driving the compressor is an electric motor with a stator and a rotor, wherein the at least one connecting element is arranged through a feedthrough hole of the casing to protrude from a volume enclosed by the casing, and wherein the connection arrangement has a sealing element in each case with a sealing sleeve for the at least one connecting element, which is arranged in an area of the feedthrough hole of the casing and a through hole of the holding element, full-circumferentially enclosing the at least one connecting element, abutting in each case on the at least one connecting element and on the casing and on the holding element in a fluid-tight and electrically insulating manner between the at least one connecting element and the casing, and between the at least one connecting element and the holding element, wherein the sealing sleeve of the sealing element is formed substantially hollow-cylindrically with partial areas having different diameters and arranged along a longitudinal axis, wherein the sealing sleeve of the sealing element is formed with at least three partial areas and a stepped shoulder arranged between two of the at least three partial areas, wherein the sealing sleeve of the sealing element has a first one of the at least three partial areas which is arranged so as to protrude from of the volume enclosed by the casing and the holding element, wherein the first one of the at least three partial areas has an outer diameter which is larger than a diameter of the through hole of the holding element, so that the sealing sleeve is arranged so as to abut on a surface of the holding element with an end face of the first one of the at least three partial areas aligned in the longitudinal axis, fixing the sealing sleeve.

2. The sealing arrangement according to claim 1, wherein the at least one connecting element is formed as an integral component of the stator of the electric motor.

3. The sealing arrangement according to claim 1, wherein at least two connecting elements are formed, and the sealing element has at least two sealing sleeves, wherein
the sealing element is formed unitarily with the sealing sleeves, or
the sealing sleeves of the sealing element are formed separately as individual components.

4. The sealing arrangement according to claim 1, wherein the sealing element is formed unitarily with the holding element, wherein the holding element is formed so as to be overmolded with the sealing element.

5. The sealing arrangement according to claim 1, wherein the sealing sleeve of the sealing element has a second one of the at least three partial areas adjoining the first one of the at least three partial areas in a direction of the longitudinal axis, which is arranged within the through hole of the holding element and in an area of a section of the at least one connecting element, full-circumferentially enclosing the at least one connecting element, the second one of the at least three partial areas of the sealing sleeve having
an inner diameter which corresponds to an outer diameter of the section of the at least one connecting element, and
an outer diameter which corresponds to the diameter of the through hole of the holding element.

6. The sealing arrangement according to claim 5, wherein the sealing sleeve of the sealing element has a third one of the at least three partial areas adjoining the second one of the at least three partial areas in the direction of the longitudinal axis, which is arranged within the feedthrough hole of the casing and in the area of the section of the at least one connecting element, full-circumferentially enclosing the at least one connecting element, the third one of the at least three partial areas of the sealing sleeve having
an inner diameter which corresponds to the outer diameter of the section of the at least one connecting element, and
an outer diameter which corresponds to a diameter of the feedthrough hole of the casing.

7. The sealing arrangement according to claim 6, wherein the third one of the at least three partial areas of the sealing sleeve of the sealing element has at least two sealing strips which have a shape of O-rings lined up in the direction of the longitudinal axis and connected to one another.

8. The sealing arrangement according to claim 6, wherein the stepped shoulder is formed between the second one of the at least three partial areas and the third one of the at least three partial areas of the sealing sleeve of the sealing element so as to connect the second one of the at least three partial area to the third one of the at least three partial areas.

9. The sealing arrangement according to claim 1, wherein the holding element is formed so as to be plate-shaped with surfaces arranged opposite one another and each with the through hole for receiving the at least one connecting element and the sealing sleeve of the sealing element.

10. The sealing arrangement according to claim 9, wherein the holding element abuts on an outside of the casing and has a formation for enlarging a bearing surface.

11. The sealing arrangement according to claim 9, wherein the at least one connecting element arranged within the through hole of the holding element is arranged so as to protrude from the surfaces of the holding element.

12. The sealing arrangement according to claim 1, wherein the at least one connecting element is formed as a pin-shaped plug-in connector so as to be substantially cylindrical with sections with different outer diameters arranged along a longitudinal axis.

13. The sealing arrangement according to claim 1, wherein for the at least one connecting element there is formed a receiving element which is substantially hollow-cylindrical with sections arranged along a longitudinal axis and having different inside diameters.

14. The sealing arrangement according to claim 13, wherein the receiving element has at least two sections with different inner diameters and a transition formed between the sections and on an inside in a stepped manner.

15. The sealing arrangement according to claim 13, wherein the receiving element is formed with a tapering wall on a free end face pointing in an axial direction towards the sealing sleeve of the sealing element.

16. The sealing arrangement according to claim 13, wherein the electric motor is formed with a cover element which is arranged on an end face of the stator pointing towards the casing with the feedthrough hole, wherein the receiving element is formed so as to be integrated into the cover element in such a way that a hole for passing the at least one connecting element through the receiving element and the cover element is formed.

17. A sealing arrangement for passing electrical connections through a wall of a casing of a device for driving a compressor comprising:
a connection arrangement with a holding element; and
at least one electrically conductive connecting element,
wherein the device for driving the compressor is an electric motor with a stator and a rotor, wherein the at least one connecting element is arranged through a feedthrough hole of the casing to protrude from a volume enclosed by the casing, and wherein the connection arrangement has a sealing element in each case with a sealing sleeve for the at least one connecting element, which is arranged in an area of the feedthrough hole of the casing and a through hole of the holding element, full-circumferentially enclosing the at least one connecting element, abutting in each case on the at least one connecting element and on the casing and on the holding element in a fluid-tight and electrically insulating manner between the at least one connecting element and the casing, and between the at least one connecting element and the holding element, wherein the sealing sleeve of the sealing element is formed substantially hollow-cylindrically with partial areas having different diameters and arranged along a longitudinal axis, wherein the sealing sleeve of the sealing element has a full-circumferentially formed cut in a form of a notch at an end face aligned in an axial direction and pointing into the volume enclosed by the casing.

18. The sealing arrangement according to claim 17, wherein the sealing sleeve of the sealing element is formed with at least two sealing lips aligned in the axial direction, which are arranged circumferentially and concentrically to one another on an end face.

19. The sealing arrangement according to claim 18, wherein the sealing lips of the sealing sleeve of the sealing element are formed so as to taper on free end sections pointing in the axial direction.

20. The sealing arrangement according to claim 18, wherein a first sealing surface is formed on a lateral surface of an inner, first one of the sealing lips pointing inwards in a radial direction, and in that a second sealing surface is formed on a lateral surface of an outer, second one of the sealing lips pointing outward in the radial direction.

21. A sealing arrangement for passing electrical connections through a wall of a casing of a device for driving a compressor comprising:
a connection arrangement with a holding element; and
at least one electrically conductive connecting element, wherein the device for driving the compressor is an electric motor with a stator and a rotor, wherein the at least one connecting element is arranged through a feedthrough hole of the casing to protrude from a volume enclosed by the casing, and wherein the connection arrangement has a sealing element in each case with a sealing sleeve for the at least one connecting element, which is arranged in an area of the feedthrough hole of the casing and a through hole of the holding element, full-circumferentially enclosing the at least one connecting element, abutting in each case on the at least one connecting element and on the casing and on the holding element in a fluid-tight and electrically insulating manner between the at least one connecting element and the casing, and between the at least one connecting element and the holding element, wherein the at least one connecting element is formed as a pin-shaped plug-in connector so as to be substantially cylindrical with sections with different outer diameters arranged along a longitudinal axis, wherein the at least one connecting element is arranged with a first one of the sections within the through hole of the holding element, wherein the first one of the sections of the at least one connecting element has an outer diameter, which corresponds to a diameter of the through hole minus a gap for receiving the sealing sleeve.

22. The sealing arrangement according to claim 21, wherein the first one of the sections of the at least one connecting element is enclosed at least in areas full-circumferentially by the sealing sleeve.

23. The sealing arrangement according to claim 21, wherein the at least one connecting element has a second one of the sections which adjoins the first one of the sections in a direction of the longitudinal axis and which is formed so as to have an outer diameter larger than the first one of the sections.

24. The sealing arrangement according to claim 23, wherein the second one of the sections of the at least one connecting element is formed with the outer diameter which substantially corresponds to an inner diameter of the sealing sleeve.

25. The sealing arrangement according to claim 23, wherein the second one of the sections of the at least one connecting element is enclosed at least in areas full-circumferentially by the sealing sleeve.

26. The sealing arrangement according to claim 23, wherein the at least one connecting element has a third one of the sections which adjoins the second one of the sections in the direction of the longitudinal axis and which is formed so as to have an external diameter smaller than the second one of the sections.

27. The sealing arrangement according to claim 26, wherein the at least one connecting element has a fourth one of the sections which adjoins the third one of the sections in the direction of the longitudinal axis and which is formed so as to have an outer diameter smaller than the third one of the sections.

28. A sealing arrangement for passing electrical connections through a wall of a casing of a device for driving a compressor comprising:
a connection arrangement with a holding element; and
at least one electrically conductive connecting element, wherein the device for driving the compressor is an electric motor with a stator and a rotor, wherein the at least one connecting element is arranged through a feedthrough hole of the casing to protrude from a volume enclosed by the casing, and wherein the connection arrangement has a sealing element in each case with a sealing sleeve for the at least one connecting element, which is arranged in an area of the feedthrough hole of the casing and a through hole of the holding element, full-circumferentially enclosing the at least one connecting element, abutting in each case on the at least one connecting element and on the casing and on the holding element in a fluid-tight and electrically insulating manner between the at least one connecting element and the casing, and between the at least one connecting element and the holding element, wherein for the at least one connecting element there is formed a receiving element which is substantially hollow-cylindrical with sections arranged along a longitudinal axis and having different inside diameters, wherein the receiving element is formed with a tapering wall on a free end face pointing in an axial direction towards the sealing sleeve of the sealing element, wherein the receiving element is arranged with the tapering wall protruding into a cut formed in the sealing sleeve.

* * * * *